(12) United States Patent
Hsu et al.

(10) Patent No.: US 11,327,293 B2
(45) Date of Patent: May 10, 2022

(54) WAVELENGTH CONVERSION DEVICE AND PROJECTION DEVICE

(71) Applicant: Coretronic Corporation, Hsin-Chu (TW)

(72) Inventors: Pi-Tsung Hsu, Hsin-Chu (TW); Chi-Tang Hsieh, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/736,833

(22) Filed: Jan. 8, 2020

(65) Prior Publication Data

US 2020/0225462 A1    Jul. 16, 2020

(30) Foreign Application Priority Data

Jan. 15, 2019 (CN) .......................... 201910034990.3
Sep. 25, 2019 (CN) .......................... 201910910097.2

(51) Int. Cl.
*G02B 26/00* (2006.01)
*H04N 9/31* (2006.01)
*G03B 21/20* (2006.01)

(52) U.S. Cl.
CPC ........ *G02B 26/008* (2013.01); *G03B 21/2033* (2013.01); *H04N 9/3161* (2013.01)

(58) Field of Classification Search
CPC ............ G03B 21/00–64; G02B 26/008; H04N 9/31–3197
See application file for complete search history.

(56) References Cited

U.S. PATENT DOCUMENTS

| 2017/0293211 | A1* | 10/2017 | Kobayashi | G02B 26/008 |
| 2018/0059403 | A1* | 3/2018 | Takamatsu | H04N 9/3161 |
| 2018/0299756 | A1* | 10/2018 | Maeda | H04N 9/3144 |
| 2019/0369471 | A1* | 12/2019 | Mochizuki | G03B 21/16 |

FOREIGN PATENT DOCUMENTS

| CN | 202546620 U | 11/2012 |
| CN | 102937773 A | 2/2013 |
| CN | 104834169 A | 8/2015 |
| CN | 106796387 A | 5/2017 |
| CN | 106873294 A | 6/2017 |
| CN | 211123606 U | 7/2020 |
| TW | 201723627 A | 7/2017 |

* cited by examiner

*Primary Examiner* — Michelle M Iacoletti
*Assistant Examiner* — Christopher A Lamb, II

(57) ABSTRACT

A wavelength conversion device includes a driver, a substrate and a support. The support is disposed between the driver and the substrate. The support is connected to the substrate and the driver. The driver drives the support and the substrate to rotate about a central axis. The support includes at least one through hole. The invention also provides a projection device including a light source system, the aforementioned wavelength conversion device, a light valve, and a projection lens.

17 Claims, 10 Drawing Sheets

WAVELENGTH CONVERSION DEVICE AND PROJECTION DEVICE

CROSS-REFERENCE TO RELATED APPLICATION

THIS APPLICATION CLAIMS THE PRIORITY BENEFIT OF CHINA APPLICATIONS (CN201910034990.3 FILED ON 2019 Jan. 15 AND CN201910910097.2 FILED ON 2019 Sep. 25). THE ENTIRETY OF THE ABOVE-MENTIONED PATENT APPLICATIONS IS HEREBY INCORPORATED BY REFERENCE HEREIN AND MADE A PART OF THIS SPECIFICATION.

FIELD OF THE INVENTION

The invention relates to a wavelength conversion device, and more particularly to a wavelength conversion device for a projection device and the projection device.

BACKGROUND OF THE INVENTION

Projectors may use light emitting diodes, laser light sources or halogen bulbs as light sources. The three kinds of light sources may have different advantages. Specifically, the laser light source may be preferable in light bundling, beam shape and high-brightness. Therefore, used with a fluorescent wheel, it may provide various color lights of different wavelengths. As such, laser light source is becoming the mainstream in market.

However, significant thermal energy may be generated when a high-energy laser illuminates a fluorescent wheel, and the fluorescent wheel may thus suffer from a thermal quenching effect. That is, the light conversion capability of the fluorescent wheel decreases drastically with an increase in temperature. The generated thermal energy may be transferred to the driving device of the fluorescent wheel, which may causes the service life of the driving device to be reduced or even destroyed. This situation is more serious when high conversion efficiency needed or a small-sized fluorescent wheel involved. Thus, this is an urgent problem to be solved.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength conversion device which may provide preferable heat dissipation efficiency and reduce the heat transferred to a driver.

The invention provides a projection device which may provide improved optical performance.

Other objectives, features and advantages of the present invention will be further understood from the further technology features disclosed by the embodiments of the present invention wherein there are shown and described preferred embodiments of this invention, simply by way of illustration of modes best suited to carry out the invention.

In order to achieve one or partial or all of the above or other objectives, an embodiment of the invention provides a wavelength conversion device. The wavelength conversion device includes a driver, a substrate and a support. The support is disposed between the driver and the substrate. The support is connected to the substrate and the driver. The driver drives the support and the substrate to rotate about a central axis. The support includes at least one through hole.

In order to achieve one or partial or all of the above or other objectives, another embodiment of the invention provides a projection device. The projection device includes a light source system, the aforementioned wavelength conversion device, a light valve, and a projection lens. The light source system provides an excitation beam. The wavelength conversion device converts the excitation beam and provides a converted beam. The light valve is located on a transmission path of the converted beam and the excitation beam and converts the converted beam and the excitation beam into an image beam. The projection lens is located on a transmission path of the image beam and projects the image beam.

In order to achieve one or partial or all of the above or other objectives, the wavelength conversion device provided in the disclosure includes a driver, a substrate and a support. The support is disposed between the driver and the substrate. The support is connected to the substrate and the driver. The driver drives the support and the substrate to rotate about a central axis. The substrate has a front surface and a rear surface opposite with each other. The support is connected to the rear surface. The wavelength conversion layer is disposed on the front surface. The distance of the outer edge of the support from the central axis may be one time or more the distance of the outer edge of the wavelength conversion layer from the central axis.

In order to achieve one or partial or all of the above or other objectives, another embodiment of the invention provides a projection device. The projection device includes a light source system, the aforementioned wavelength conversion device, a light valve, and a projection lens. The light source system provides an excitation beam. The wavelength conversion device converts the excitation beam and provides a converted beam. The wavelength conversion device includes a driver, a substrate and a support. The support is disposed between the driver and the substrate. The support is connected to the substrate and the driver. The driver drives the support and the substrate to rotate about a central axis. The substrate has a front surface and a rear surface opposite with each other. The support is connected to the rear surface. The wavelength conversion layer is disposed on the front surface. The distance of the outer edge of the support from the central axis may be one time or more the distance of the outer edge of the wavelength conversion layer from the central axis. The light valve is located on a transmission path of the converted beam and the excitation beam and converts the converted beam and the excitation beam into an image beam. The projection lens is located on a transmission path of the image beam and projects the image beam.

The substrate and support of the invention can achieve a good heat dissipation effect by a preferred heat conduction path. The support includes at least one through hole, thus an air medium is provided. The air medium helps to block heat, that is, the air medium helps to prevent the driver from receiving excessive heat and suffering from a high temperature. Furthermore, in the invention, a driver is used to drive the substrate and the support to rotate. The airflow generated during the rotation can pass through the at least one through hole in the support, thereby taking heat away from the support and the substrate. Therefore, the wavelength conversion device of the embodiment of the invention can improve the heat dissipation efficiency and also reduce the heat transferred to the driver, thereby reducing the overall temperature of the wavelength conversion device and extending the service life of the driver.

Other objectives, features and advantages of the invention will be further understood from the further technological features disclosed in the embodiments of the invention, wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
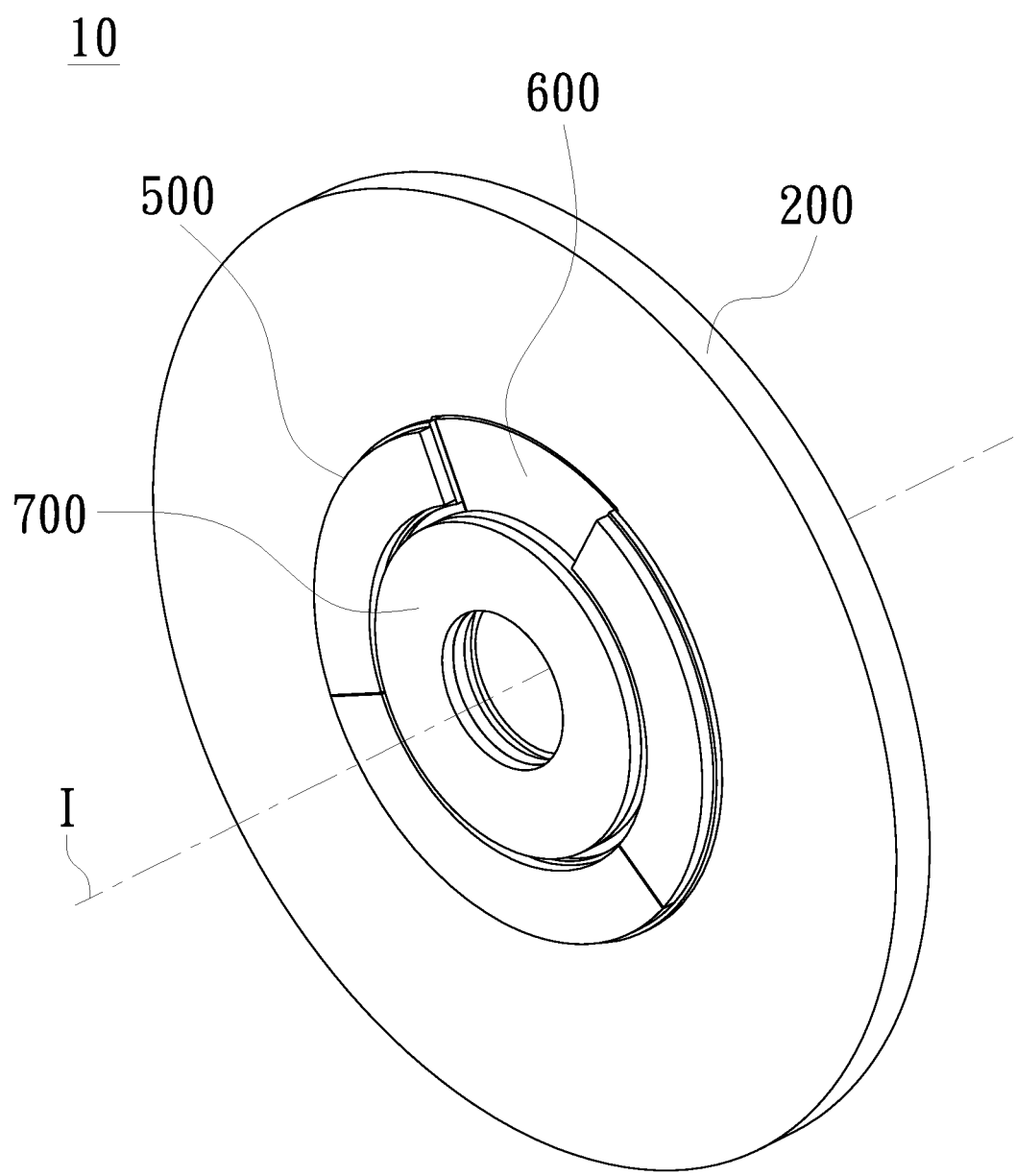
FIG. 1 is a schematic perspective view of a wavelength conversion device according to an embodiment of the invention.
Figure 2:
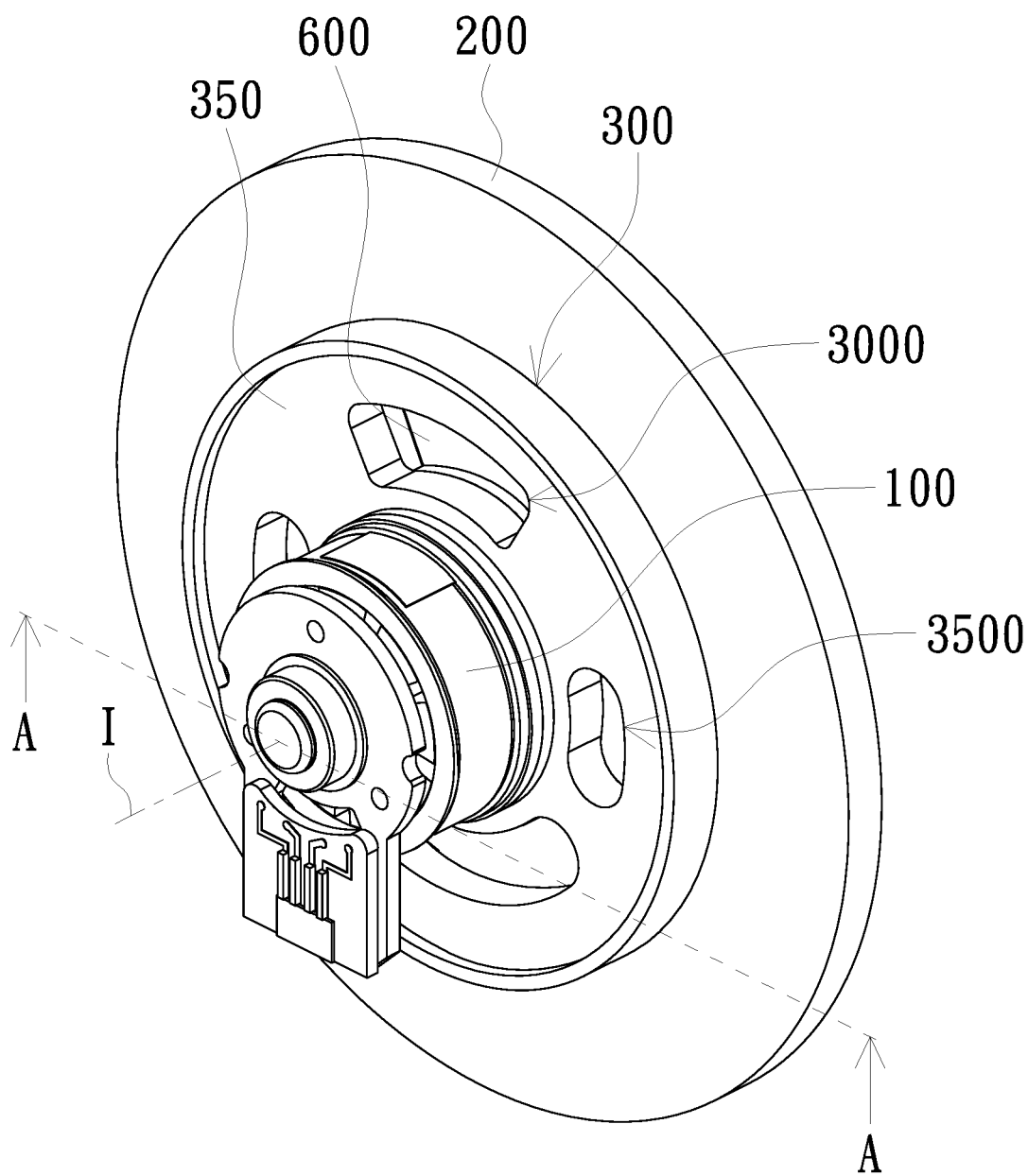
FIG. 2 is a schematic perspective view of the wavelength conversion device shown in FIG. 1 from another viewing angle.
Figure 3:
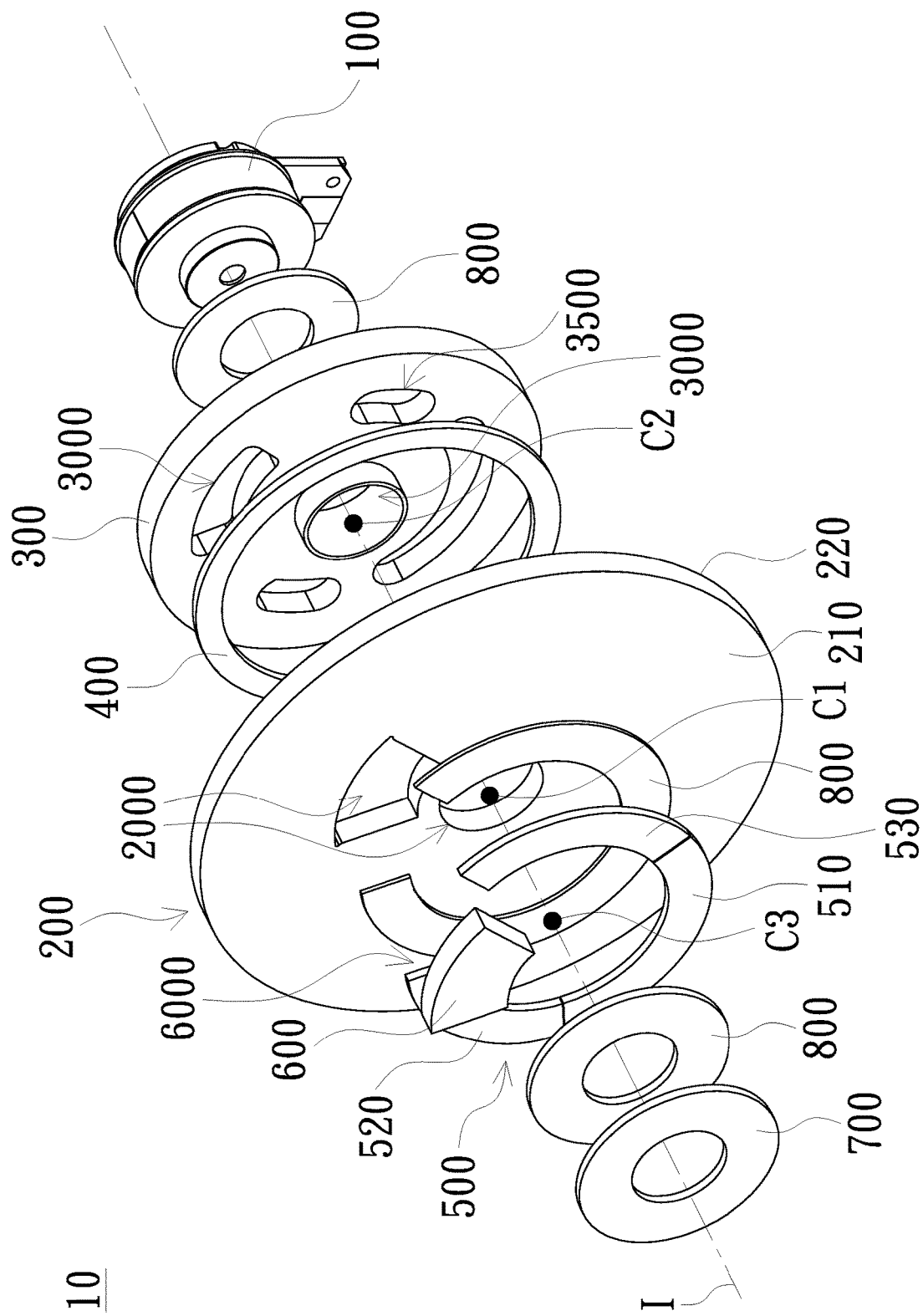
FIG. 3 is a schematically exploded view of the wavelength conversion device shown in FIG. 1.

FIGS. 1-3 are schematically perspective and exploded views of a wavelength conversion device according to an embodiment of the invention. As shown in FIGS. 1-3, the wavelength conversion device 10 includes a driver 100, a substrate 200 and a support 300. The support 300 is disposed between the substrate 200 and the driver 100 and includes at least one through hole 3500. The support 300 is connected to the substrate 200 and the driver 100. The driver 100 drives the support 300 and the substrate 200 to rotate about the central axis I. Further, the driver 100 can be, for example, a motor, and the driver 100 and the support 300 can be connected by, for example, gluing, locking, tight fitting, etc., to drive the support 300 and the substrate 200 to rotate about the central axis I, but the invention is not limited thereto. For example, the driver 100 and the support 300 may also be formed integrally, such as having an integrally-formed structure. In the embodiment, the driver 100 can be connected to the central portion of the support 300 adjacent to the central axis I.

Figure 4:
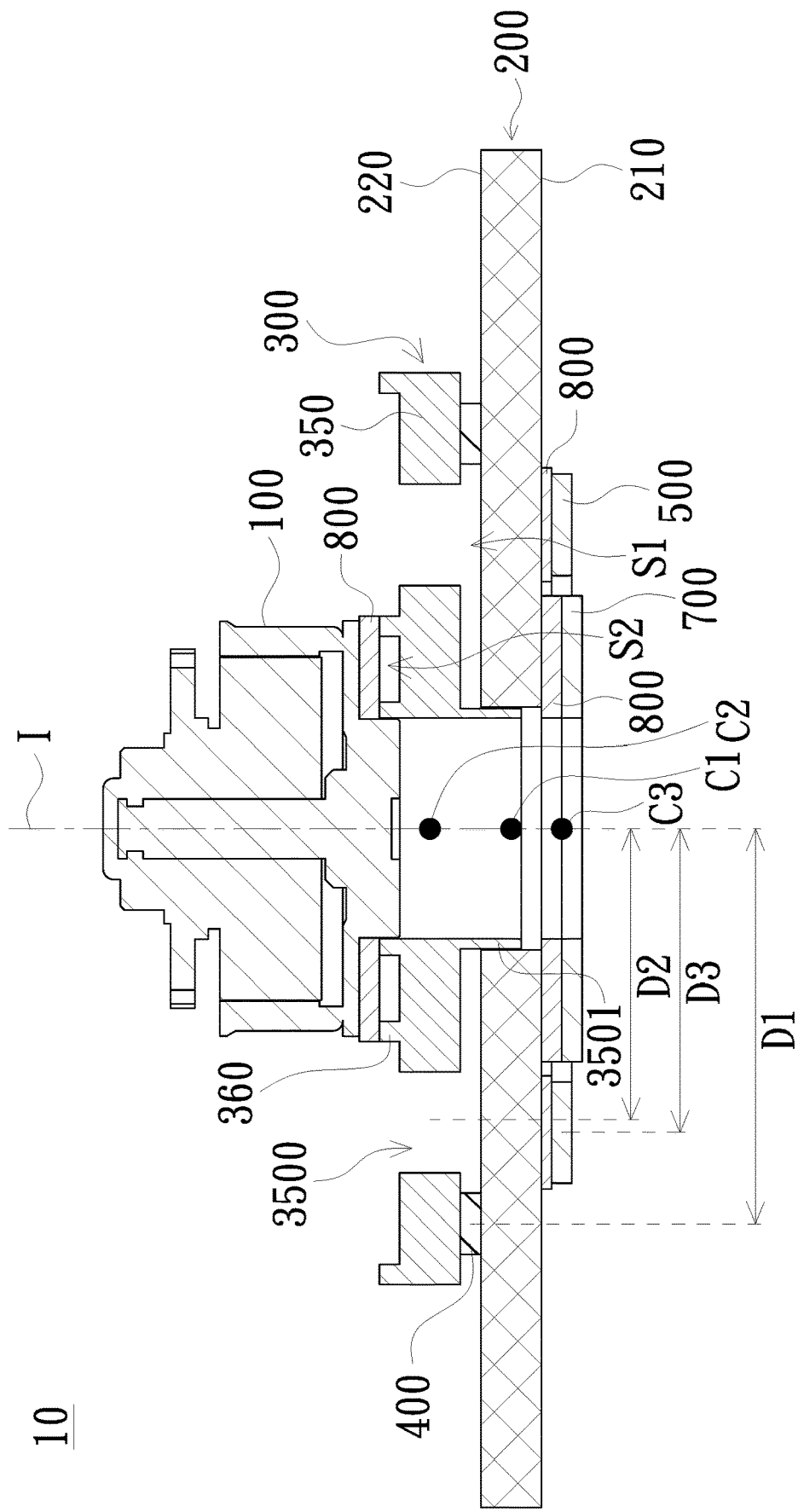
FIG. 4 is a schematic cross-sectional view of the wavelength conversion device shown in FIG. 2 taken along line A-A.

The support 300 and the substrate 200 can be connected by, for example, gluing, locking, and fitting. Referring to FIG. 4, FIG. 4 is a cross-sectional view of the wavelength conversion device shown in FIG. 1 according to an embodiment of the invention. In the embodiment, for example, the support 300 has a connecting portion 3501. The connecting portion 3501 connects to the substrate 200 by a glue layer, an engaging structure, or the like. In other embodiments, the support 300 and the substrate 200 may also be formed integrally, for example, having in an integrally-formed structure. In the embodiment, the substrate 200 is a plate with a preferable heat conduction coefficient, and its material may be metal (e.g., aluminum), aluminum alloy, ceramic, graphite, or glass, but the invention is not limited thereto. The material of the support 300 may be, for example, metal, alloy, ceramic, graphite, or glass, and the invention is not limited thereto. The support 300 connects the substrate 200 and the driver 100, and provides preferable stability while the combination of the support 300 and the substrate 200 rotates about the central axis I. In other embodiments, the invention does not limit the material of the support 300.

The substrate 200 also has a first rotation center C1, the support 300 has a second rotation center C2, and the central axis I passes through the first rotation center C1 and the second rotation center C2. The substrate 200 and the support 300 rotate about the central axis I. In some embodiments, the substrate 200 and the support 300 may respectively be disc-shaped and each have a diameter (diameter distance), and the first rotation center C1 and the second rotation center C2 may respectively correspond to the center of the substrate 200 and the center of the support 300. The disc-shaped design helps to improve the rotational stability and lower the drag force, but the invention does not limit the shape of the substrate 200 and the support 300.

At least one opening 2000 may also be formed on the substrate 200. The at least one opening 2000 may serve as a mounting hole for the driver 100 and for mounting the optical component 600. The optical component 600 forms a light transmitting region or a light reflecting region. The optical element 600 is, for example, a light transmissive plate or a plate member having a highly reflective coating. At least one opening 3000 may also be formed on the support 300, and the least one opening 3000 may correspond to the at least one opening 2000 of the substrate 200. The at least one opening 3000 of the support 300 may serve as a mounting hole of the driver 100 and correspond to the opening of the substrate 200 for mounting the optical element 600. The at least one through hole 3500 may be formed on the support 300 by a hollowed-out process, for example. The at least one through hole 3500 can be used for heat insulation and/or serve as an airflow passage, thereby reducing the heat transferred between (i.e., insulation) the substrate 200 and the driver 100, and/or helping dissipate heat (will be described in detail later). Further, the support 300 may include a plate portion 350, and the through hole 3500 may be formed in the plate portion 350.

FIG. 4 is a schematic cross-sectional view of the wavelength conversion device of FIG. 1 according to an embodiment of the invention. As shown in FIG. 4, the plate portion 350 of the support 300 is substantially parallel to and spaced apart from the substrate 200. A first spacing space S1 is formed by the support 300 and the substrate 200 and is in communication with the at least one through hole 3500. The support 300 can also include other structures, such as ridges 360 or bumps formed on the surface. For example, the ridges 360 or the bumps may be disposed continuously or discontinuously along the circumferential direction of the support 300, thereby avoiding weight imbalance or center offset of the support 300. That is, by the bumps and/or the ridges 360 of the support 300 matched with the openings 3000 and/or the through hole 3500 of the support 300, the weight balance and the center of gravity of the support 300 are maintained, and therefore the weight balance and the center of gravity of the combination of the support 300 and the substrate 200 are maintained. As such, the rotational dynamic balance and rotation stability of the wavelength conversion device 10 can be maintained. In some embodiments, the support 300 can also be connected to the driver 100 via a structure such as a ridge. For example, the support 300 may include at least one ridge 360 disposed on an opposite surface of the plate portion 350 facing the substrate 200. The at least one ridge 360 may surround the central axis I and be connected to the driver 100. The driver 100, the at least one ridge 360 of the support 300, and the plate portion 350 of the support 300 may form a second spacing space S2, but the invention is not limited thereto.

Figure 5:
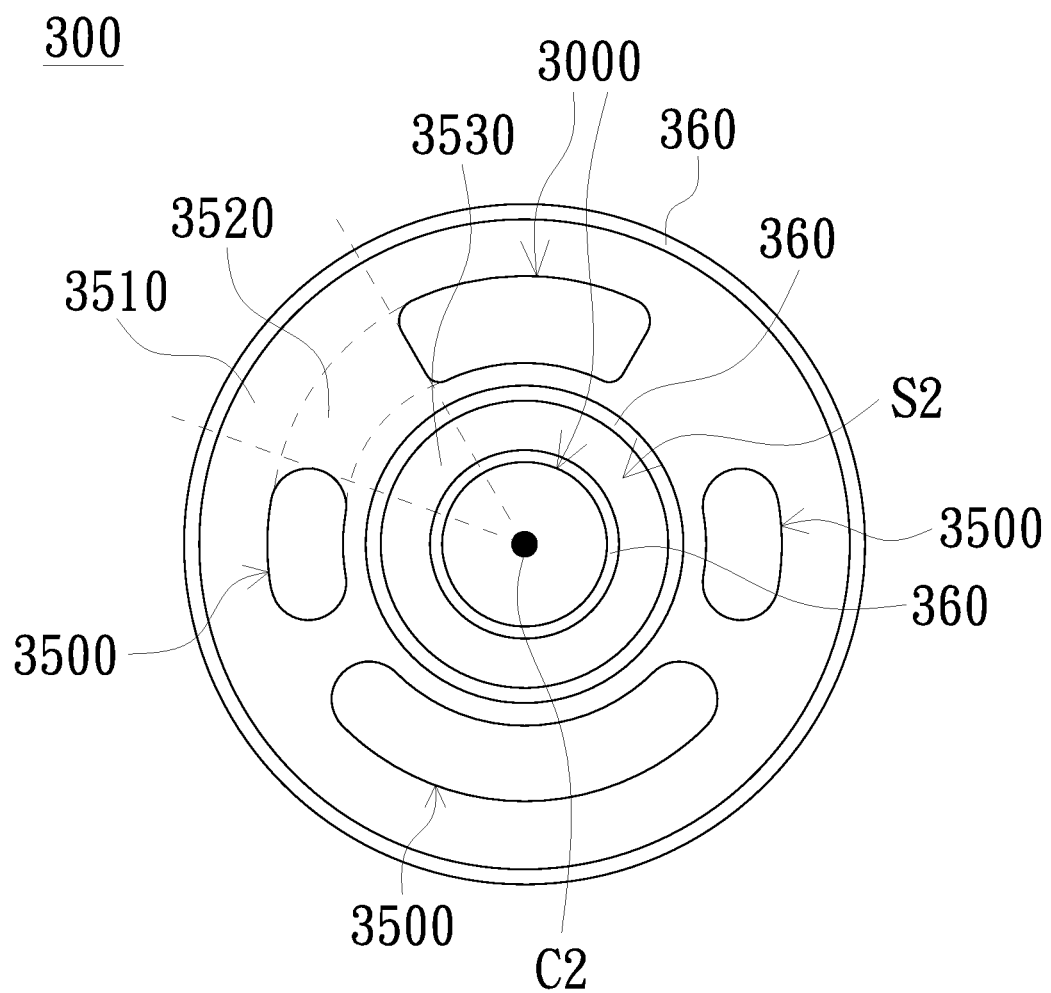
FIG. 5 is a schematic top view of a support according to an embodiment of the invention.
Figure 6:
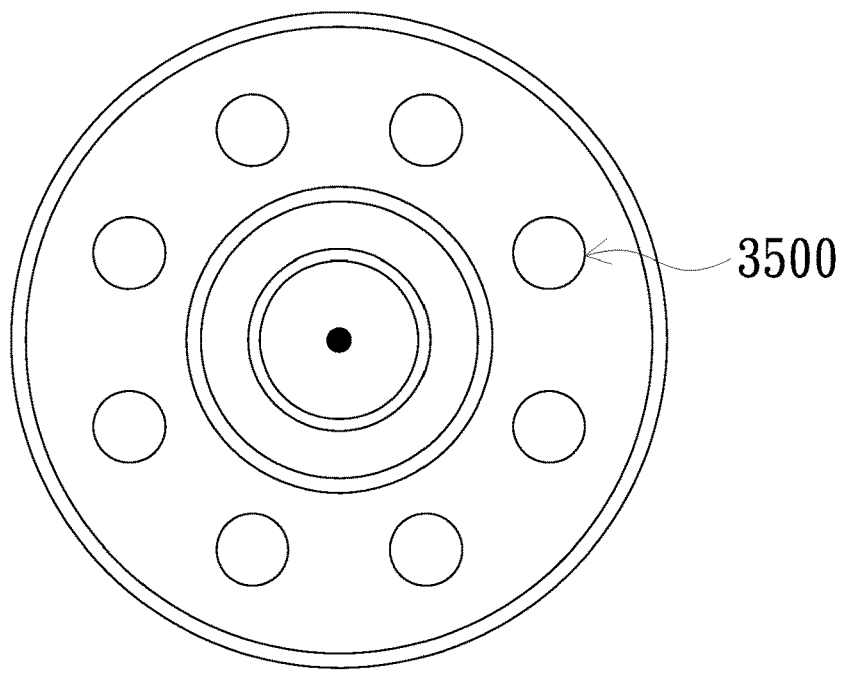
FIG. 6 is a schematic top view of a support according to another embodiment of the invention.
Figure 7:
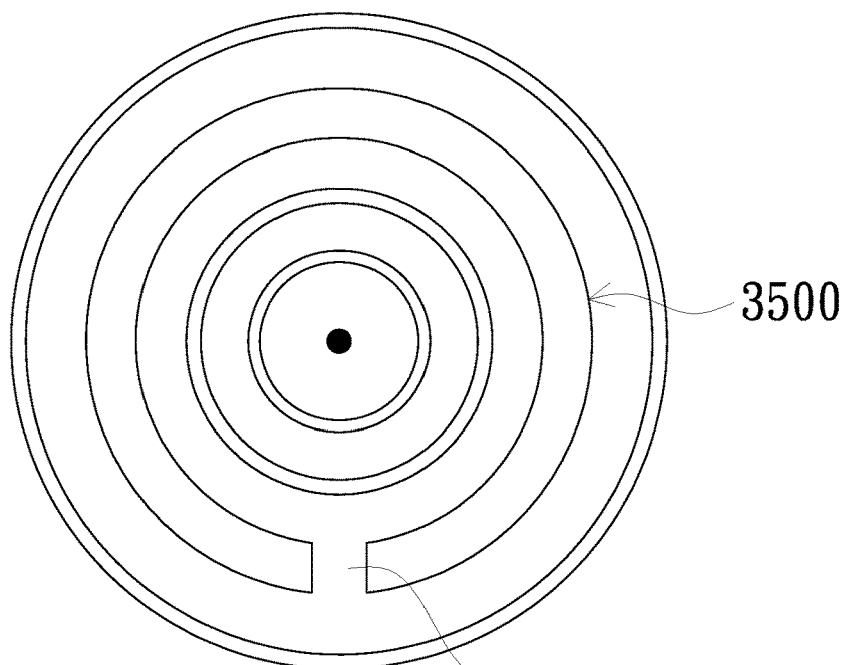
FIG. 7 is a schematic top view of a support according to still another embodiment of the invention.

FIG. 5 is a schematic top view of the support in FIG. 1 according to an embodiment of the invention. As shown in FIGS. 2-3 and 5, the support 300 includes a plurality of through holes 3500. The plurality of through holes 3500 may be arranged substantially along an annular path, and the center of the annular path overlaps with the second rotation center C2. All or some of the plurality of through holes 3500 may also be arranged in a central symmetry with respect to the second rotation center C2, but the invention is not limited thereto. As shown in FIG. 5, the plurality of through holes 3500 includes a pair of short curved through holes, and the short curved through holes are similar in shape and arranged in a central symmetry with respect to the second rotation center C2. The plurality of through holes 3500 further includes a long curved through hole, and the long curved through hole may have the same or different shape and/or size as the short curved through hole. The support 300 of the embodiment shown in FIG. 5 includes a long curved through hole and two short curved through holes, wherein the two short curved through holes have the same shape and size, and are similar in shape but different in size to the long curved through hole. In the embodiment, one long curved through hole and two short curved through holes are arranged in a non-central symmetry with respect to the second rotation center C2. However, the invention does not limit the size, shape, location, and/or arrangement of the through holes 3500. In another embodiment as shown in FIG. 6, the plurality of through holes 3500 of the support 300a may be round through holes and arranged in a central symmetry with respect to the second rotation center C2. In still another embodiment as shown in FIG. 7, the through hole 3500 of the support 300b may be an annular through hole. The head and tail of the annular through hole are not connected with each other, and a bridge portion 3100 is formed between the head and the tail. The annular through hole 3500 divides the support 300b into an inner portion and an outer portion, and the bridge portion 3100 connects the inner portion and the outer portion of the support 300b. The terms "inner" and "outer" as used in the invention may be used to describe a positional relationship with respect to the second rotation center C2. In some or other embodiments, the plate portion 350 of at least one of the support 300, 300a and 300b can be divided into a first portion 3510, a second portion 3520 and a third portion 3530 inwardly. The first portion 3510 may be located radically at the outside of the through hole 3500, the third portion 3530 may be located radically at the inside of the through hole 3500, and the second portion 3520 is located radically between the first portion 3510 and the third portion 3530.

As shown in FIGS. 3 and 4, the wavelength conversion device 10 further includes at least one connection unit 400. The at least one connection unit 400 is disposed between the substrate 200 and the support 300 along the circumferential direction of the support 300 and contacts both the substrate 200 and the support 300. In the radial direction, the average distance D1 of the center of the at least one connection unit 400 from the central axis I is greater than the average distance D2 of the center of the at least one through hole 3500 of the support 300 from the central axis I. The aforementioned radial direction is substantially the radial direction of the virtual circle in which the center thereof is on the central axis I, the average distance D1 may be the average of the distance from the outer edge of the connection unit 400 to the central axis I and the distance from the inner edge of the connection unit 400 to the central axis I, and the average distance D2 may be the average of the distance from the outer edge of the through hole 3500 to the central axis I and the distance from the inner edge of the through hole 3500 to the central axis I, but the invention is not limited thereto. In the embodiment, the at least one connection unit 400 may be located outside the at least one through hole 3500, and the distance from the inner edge of the connection unit 400 to the central axis I is greater than or equal to the distance from the outer edge of the through hole 3500 to the central axis I. The terms "inner" and "outer" are relative to the central axis I. That is, in the radial direction, the closer to the central axis I, the more inner it is, and the more away from the central axis I, the more outer it is.

Figure 10:
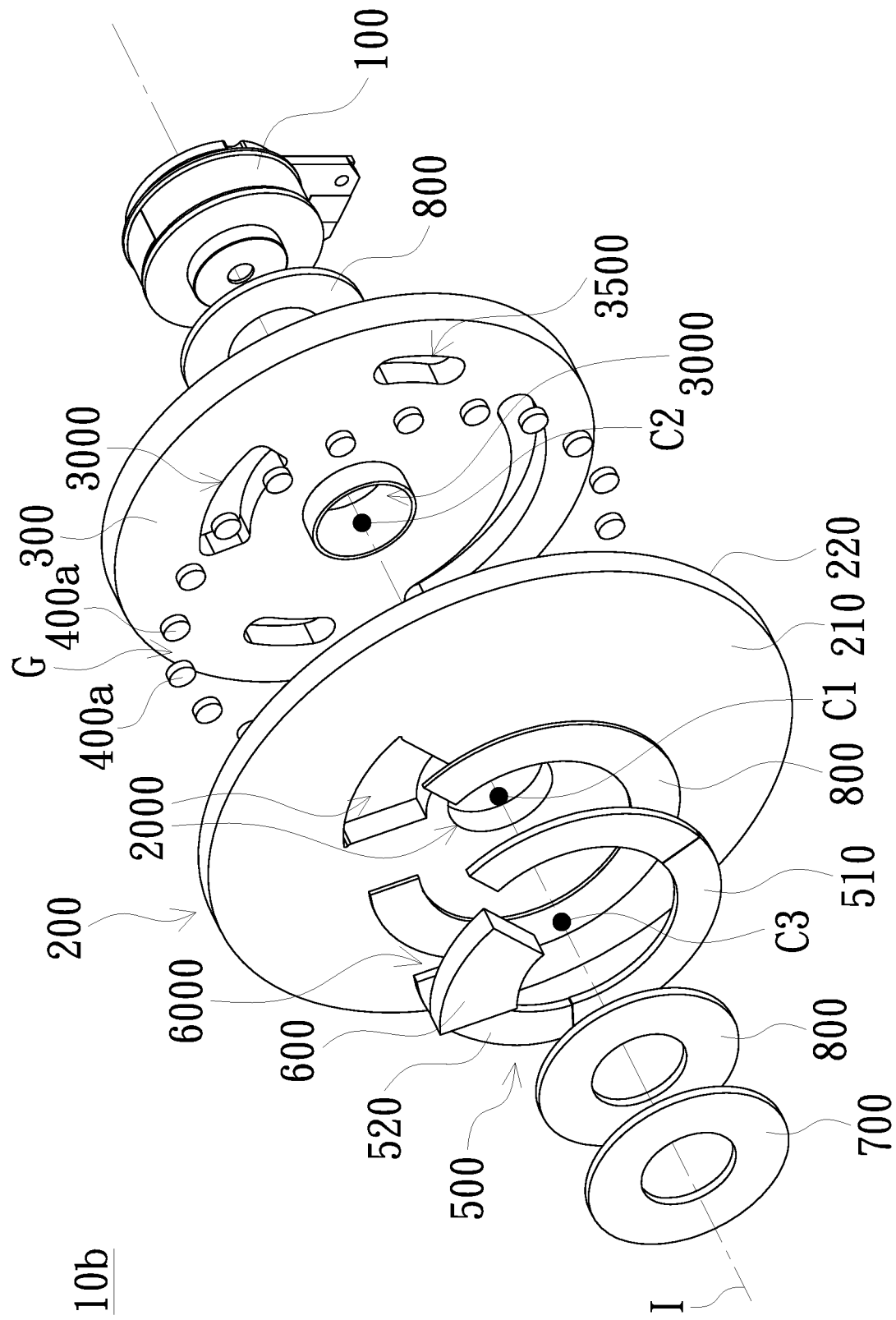
FIG. 10 is a schematically exploded view of a wavelength conversion device according to another embodiment of the invention.

In some embodiments, the at least one connection unit 400 can include a glue material to bond the substrate 200 to the support 300. Specifically, the connection unit 400 can be formed as a glue layer for connecting the substrate 200 and the support 300 and the glue layer comprises continuously dispensed glue (as shown by reference numeral 400 in FIG. 3). In other embodiments, the connection unit 400 can also be formed as a glue layer for connecting the substrate 200 and the support 300, and the glue layer comprises a plurality of glue points discontinuously dispensed between the substrate and the support (as shown by reference numeral 400a in FIG. 10). In this case as shown in FIG. 10, the glue layer of the connection unit 400 may include a plurality of glue portions that are discontinuously arranged along the circumferential direction of the support 300. The invention does not limit the material and distribution form of the connection unit 400. For example, in other embodiments, the at least one connection unit 400 and the support 300 may be formed integrately. The wavelength conversion device 10 may also include a plurality of connection units 400, which are continuously or discontinuously arranged along the circumferential direction of the support 300. In the embodiment, the at least one connection unit 400 may separate the substrate 200 from the plate portion 350 of the support 300 to form the first spacing space S1 in communication with the at least one through hole 3500.

As shown in FIGS. 3-4, the wavelength conversion device 10 further includes a wavelength conversion layer 500. The substrate 200 has a front surface and a rear surface 220 opposite with each other. The support 300 is connected to the rear surface 220 of the substrate 200. The wavelength conversion layer 500 is disposed on the front surface 210 of the substrate 200 to receive a beam ranging in a wavelength range and convert it into a beam ranging in another wavelength range. The wavelength conversion device 10 may further include a cover 700 disposed on the front surface 210 of the substrate 200, for example, to increase the structural strength of the wavelength conversion device 10. A connection layer 800 may be disposed between the cover 700 and the substrate 200. The connection layer 800 may be, for example, a glue layer to bond the cover 700 to the front surface 210, but the invention is not limited thereto.

In an embodiment, as shown in FIG. 4, the outer edge of the orthographic projection of the connection unit 400 onto the front surface 210 of the substrate 200 is positioned from the central axis I a distance greater than or equal to the distance of the outer edge of the wavelength conversion layer 500 from the central axis I. Additionally or alternatively, the inner edge of the orthographic projection of the connection unit 400 onto the front surface 210 of the substrate 200 is positioned from the central axis I a distance greater than or equal to the distance of the inner edge of the wavelength conversion layer 500 from the central axis I.

The wavelength conversion layer 500 disposed on the substrate 200 is also rotated while the substrate 200 and the support 300 are rotated about the central axis I. In an embodiment, the excitation beam from the light source system may be a laser beam, but the invention is not limited thereto. In an embodiment, the wavelength conversion layer 500 can include a first region 510 and a second region 520. Specifically, in an embodiment, the first region 510 can convert an excitation beam (e.g., excitation beam having a blue wavelength or excitation beam having a violet wavelength) into a first sub-converted beam, and the second region 520 can convert an excitation beam into a second sub-converted beam. The first sub-converted beam and the second sub-converted beam are respectively emitted from the first region 510 and the second region 520 of the wavelength conversion layer 500 sequentially to form a converted beam. The wavelength range of the first sub-converted beam and the wavelength range of the second sub-converted beam may be the same or different. The converted beam can be a beam having a yellow wavelength and/or a beam having a green wavelength, but the invention is not limited thereto. The wavelength conversion layer 500 can further include a third region 530, which converts the excitation beam into a third sub-converted beam. The third sub-converted beam can be, for example, a beam having a red wavelength. The excitation beam can be sequentially incident on different regions to excite the converted beams having different wavelength ranges while the wavelength conversion layer 500 is rotated.

The wavelength conversion layer 500 includes a wavelength conversion substance, such as a phosphor, a phosphor-admixed phosphor layer, a phosphor ceramic, a glass phosphor, and the like. The wavelength conversion layer 500 may be formed on the substrate 200 by different processes. The invention does not limit the form of the wavelength conversion substance. A connection layer 800 may be disposed between the wavelength conversion layer 500 and the front surface 210 of the substrate 200. The connection layer 800 is, for example, a glue layer for bonding the wavelength conversion layer 500 to the front surface 210, but the invention is not limited thereto. In other embodiments, the wavelength conversion substance may be directly, for example, coated on the front surface 210 of the substrate 200 to form the wavelength conversion layer 500.

The wavelength conversion layer 500 has a third rotation center C3. The central axis I passes through the third rotation center C3, and the wavelength conversion layer 500 rotates about the central axis I. In the embodiment, the wavelength conversion layer 500 may be ring-shaped. The ring has a notch 6000 corresponding to the opening 2000 of the substrate 200 and the opening 3000 of the support 300, and the center of the ring is located substantially at the third rotation center C3. The wavelength conversion device 10 further includes an optical element 600. The optical element 600 is positioned corresponding to the notch 6000 and the openings 2000, 3000, and can be disposed in the opening 2000. In the embodiment, the optical component 600 can be bonded to the opening 2000 of the substrate 200 by a glue, but the invention is not limited thereto. In summary, the portion of the substrate 200 embedded with the optical element 600 forms a light transmitting region or a light reflecting region to allow the excitation beam to pass through or to reflect the excitation beam. When the wavelength conversion layer 500 is rotated, the excitation beam can be incident on different regions of the wavelength conversion layer 500 to excite color beams of different wavelengths. The excitation beam can pass through the optical element 600 and the openings 2000, 3000, or alternatively be reflected by the optical element 600 with a highly reflective coating thereon.

Figure 8:
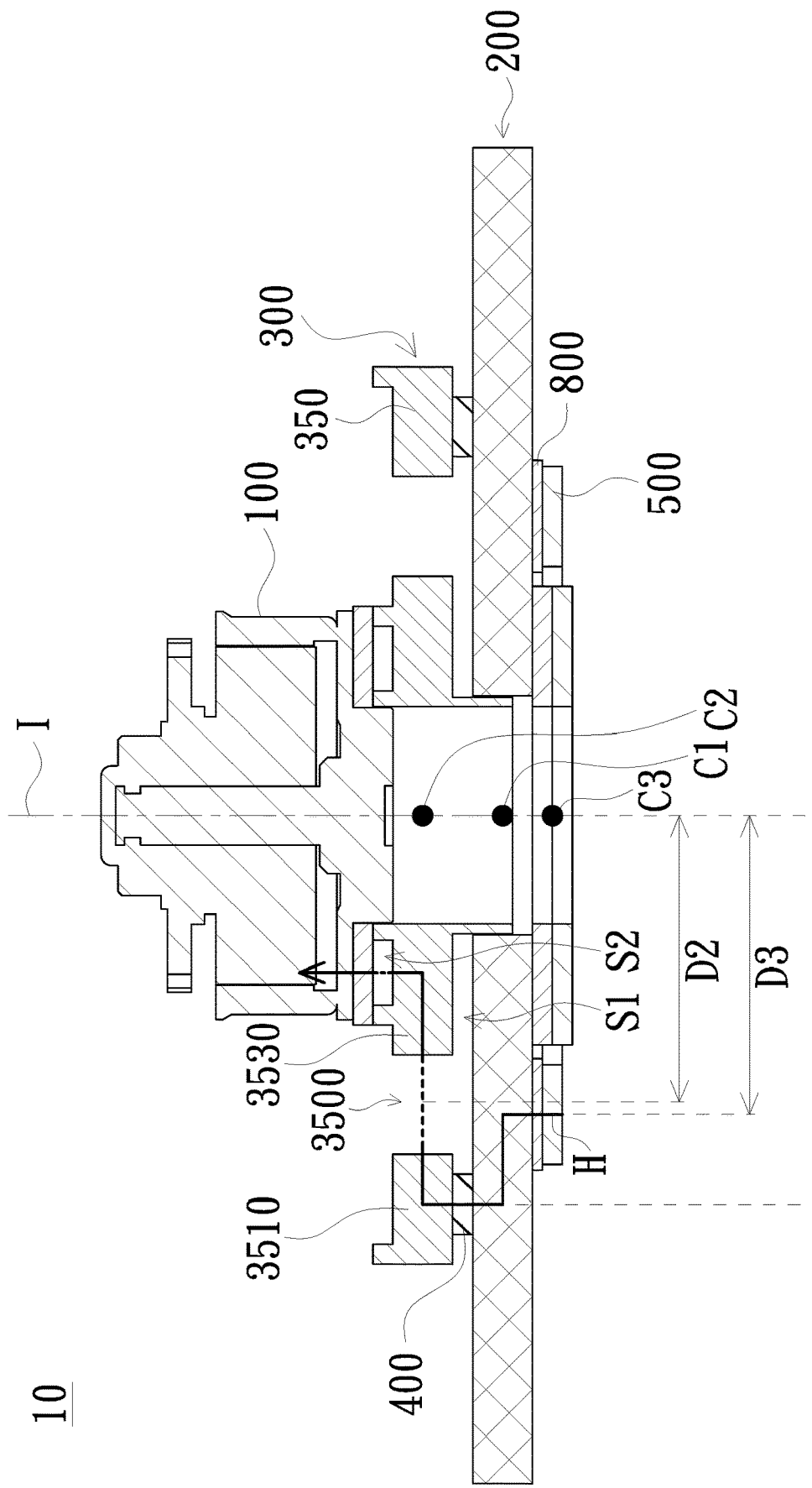
FIG. 8 is a schematic view of a heat dissipation path shown in FIG. 1 according to an embodiment of the invention.

Heat is generated when the excitation beam excites the wavelength conversion substance, and heat may affect the efficiency of forming a converted beam by the wavelength conversion substance. When heat is further transferred to the driver 100, components of the driver 100, such as thermally sensitive electronic components, electrical components, etc., may be disadvantageously affected, thereby reducing the service life of the driver 100. FIG. 8 is a schematic diagram of a heat transfer and heat dissipation path of the wavelength conversion device shown in FIG. 1 according to an embodiment of the invention. As shown in FIG. 8, in the radial direction, the average distance D3 of the center of the wavelength conversion layer 500 from the central axis I is not greater than the average distance D1 of the at least one connection unit 400 from the central axis I. However, the invention is not limited thereto. The meaning of the average distance has been described above, and redundant detail may be omitted herein.

As shown in FIG. 8, the heat dissipation path H reaches the driver 100 from the wavelength conversion layer 500 sequentially via the substrate 200, the connection unit 400 and the support 300. The first spacing space S1 is formed between the substrate 200 and the support 300. In some embodiments, the heat conduction coefficient of air can be from 0.01 to 0.05 W/m·K. In a specific embodiment, the heat conduction coefficient of air is 0.026 W/m·K. In comparison, for example, in the embodiment where the connection unit 400 is a glue layer, the heat conduction coefficient of the glue layer is from 0.1 to 5 W/m·K. In a specific embodiment, the heat conduction coefficient of the glue layer is, for example, 0.2 W/m·K or 2.0 W/m·K. The heat conduction coefficient of metal or alloy is from 200 to 300 W/m·K or higher. In the embodiment, the first spacing space S1 between the substrate 200 and the support 300 has air medium with low heat conduction coefficient therein, thus, the first spacing space S1 can serve as a heat block/insulation structure between the substrate 200 and the support 300. The heat block/insulation structure may reduce the heat transferred to the support 300, thereby reducing the heat transferred to the driver 100. In the embodiment, the at least one connection unit 400 contacts both the substrate 200 and the support 300. For example, the at least one connection unit 400 contacts the first portion 3510 of the support 300. Since the average distance D1 is greater than the average distance D2 (in other words, the at least one connection unit 400 is located outside the at least one through hole 3500), heat may be transferred to the support 300 via the connection unit 400, for example, transferred to the first portion 3510 of the support 300. The heat transferred to the first portion 3510 can be further transferred to the third portion 3530 via the second portion 3520 of the support 300 (first sub-heat dissipation path as described below), as shown in FIG. 5. In the embodiment, the at least one through hole 3500 disposed in the support 300 can partially block the first portion 3510 and the third portion 3530 of the support 300 (second sub-heat dissipation path as described below), thus, the heat block/insulation effect is achieved, and thereby reducing the heat transferred to the driver 100. It should be noted that the opening 3000 of the support 300 may also provide the function similar to the at least one through hole 3500. In the embodiment, since the wavelength conversion device 10 has the heat dissipation path H sequentially passing through the wavelength conversion layer 500, the substrate 200, the at least one connection unit 400 and the support 300 and the air medium on the heat dissipation path H may have low heat conduction coefficient, the heat transferred to the drive 100 is reduced.

Specifically, the heat dissipation path H includes a first sub-heat dissipation path and a second sub-heat dissipation path. As shown in FIG. 5, the first sub-heat dissipation path sequentially passes through the wavelength conversion layer 500, the substrate 200, the at least one connection unit 400, the first portion 3510 of the support 300, the second portion 3520 of the support 300, and the third portion 3530 of the support 300. As shown in FIG. 8, the second sub-heat dissipation path sequentially passes through the wavelength conversion layer 500, the substrate 200, the at least one connection unit 400, the first portion 3510 of the support 300, and the air at the at least one through hole 3500. The first sub-heat dissipation path helps to conduct heat away from the heated wavelength conversion layer 500, the second sub-heat dissipation path can provide heat block/insulation effect, and therefore the driver 100 is prevented from receiving excessive heat. In some embodiments, the heat dissipation path H may also pass through the air in the second spacing space S2, that is, the second spacing space S2 may also provide the heat block/insulation effect between the support 300 and the driver 100.

In some embodiments, as described above, the average distance D3 of the wavelength conversion layer 500 from the central axis I is not greater than the average distance D1 of the at least one connection unit 400 from the central axis I. In other words, heat is transferred on the portion of the substrate 200 between the wavelength conversion layer 500 and the connection unit 400. Such a heat conductive path helps to increase the proportion of heat that escapes from the substrate 200 to the outside of the wavelength conversion device 10, and helps to reduce the heat transferred to the support 300 via the connection unit 400, thereby preventing the driver 100 from receiving excessive heat. In a specific embodiment, the connection unit 400 can be a glue material. Since the heat conduction coefficient of the glue material is much smaller than that of metal, for example, the heat conduction coefficient of the glue material can be ⅟1000 of that of the metal, the glue material of the connection unit 400 can further reduce the heat transferred to the support 300 via the at least one connection unit 400, or may reduce the heat transfer efficiency of the heat from the substrate 200 to the support 300, thereby protecting the driver 100.

As described above, in the embodiment, the length of the heat dissipation path H can be extended by increasing the difference between the average distances D1 and D2. For example but without limitation, the length of the heat dissipation path H can be extended by increasing the diameter of the support 300, by increasing the radial dimension of the through hole 3500, and/or by disposing the through hole 3500 at a position relatively farther from the central axis I (from the second rotation center C2). In some embodiments, the at least one through hole 350 that is closer to the edge of the support 300 facilitates increasing the length of the heat dissipation path H. In other embodiments, increasing the area of the support 300 also helps to increase the heat dissipation area, thereby facilitating dissipating of the heat transferred to the substrate 200 into the air surrounding the wavelength conversion device 10. As shown in FIG. 8, in another embodiment, the distance of the outer edge of the support 300 from the central axis I may be one time or more the distance of the outer edge of the wavelength conversion layer 500 from the central axis I. Additionally or alternatively, the distance of the outer edge of the substrate 200 from the central axis I that is 1.2 times or more the distance of the outer edge of the wavelength conversion layer 500 from the central axis I. The above designs can increase the heat conductive path and also help the process of heat dissipation. In some embodiments, with different designs in size, distribution pattern of the at least one through hole 3500 and volume of the first spacing space S1, the heat block/insulation effect for the driver 100 may be achieved by using the through hole 3500 and the first spacing space S1, and the optimization of the heat dissipation effect for the substrate 200 may also be achieved. In an embodiment, increasing the number and/or size of the through holes 3500 can help to reduce the heat transferred to the driver 100, and such a heat block/insulation design helps to protect the driver 100. In another embodiment, increasing the area of the support 300 and/or the volume of the first spacing space S1 can help to dissipate the heat transferred to the substrate 200 into the surrounding environment, and such a design facilitates heat dissipation. In some embodiments, the heat transferred to the driver 100 can be reduced by 65-75%, but the invention is not limited by this range. In one embodiment, a combination of such designs can cool down the drive 100 by 9° C.

Figure 9:
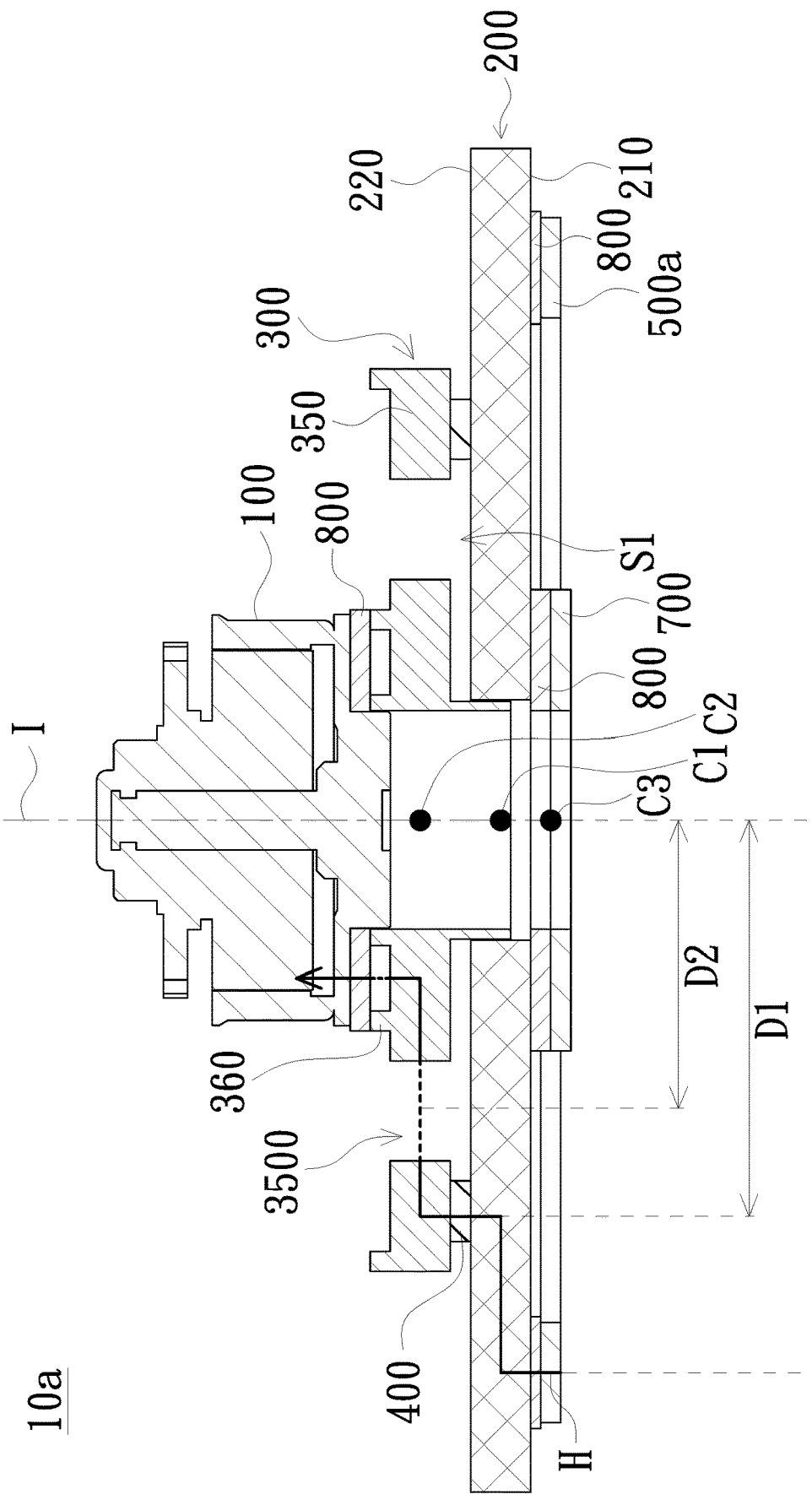
FIG. 9 is a schematic cross-sectional view of a wavelength conversion device according to another embodiment of the invention.

FIG. 9 is a schematic cross-sectional view of a wavelength conversion device according to another embodiment of the invention. As shown in FIG. 9, in the radial direction, the average distance D3 of the wavelength conversion layer 500*a* from the central axis I is greater than the average distance D1 of the at least one connection unit 400 from the central axis I. The main difference between this embodiment and the embodiment shown in FIGS. 1-4 and 8 is that the wavelength conversion layer 500*a* is different in radial position on the substrate 200. However, it is to be noted that the wavelength conversion device 10*a* also provides a heat dissipation path H that passes through the wavelength conversion layer 500, the substrate 200, the at least one connection unit 400 and the support 300. Less heat is transferred to the driver 100 through such a heat dissipation path H. In the embodiment, for example, the length of the heat dissipation path H can be extended by increasing the difference between the average distances D1 and D3. In other embodiments, the length of the heat dissipation path H can also be extended by other suitable design, which is not limited by the invention. For example, the heat reduction and even cooling effect of the driver 100 can be achieved by increasing the heat conductive path, providing a heat block/insulation structure (e.g., through hole 3500 and/or first spacing space) and/or increasing the heat dissipation area of the substrate/support.

FIG. 10 is a schematically exploded view of a wavelength conversion device according to still another embodiment of the invention. The main difference between this embodiment and the embodiments shown in FIGS. 1-4 and 8 is that the wavelength conversion device 10*b* of this embodiment includes a plurality of connection units 400. For example, the plurality of connection units 400 may include a plurality of glue portions 400*a* formed by discontinuously dispensing between the substrate 200 and the support 300, but the invention is not limited thereto.

As shown in FIG. 10, the plurality of connection units 400 includes a plurality of glue portions (as shown by reference numeral 400*a*). In an embodiment, the plurality of glue portions 400*a* separates the substrate 200 from the plate portion 350 of the support 300, and a gap (spacing) G is formed between two adjacent glue portions 400*a*. In the embodiment, the first spacing space S1 formed between the substrate 200 and the plate portion 350 of the support 300 communicates with the external environment by the gaps G formed by the plurality of glue portions 400*a*. Specifically, in a specific embodiment, the first spacing space S1 can communicate with the through hole 3500 and the gap G, so that the through hole 3500 and the gap G can respectively serve as the inlet and outlet of the first spacing space S1, and vice versa. As such, an airflow passage passing through the through hole 3500, the first spacing space S1 and the gap G is formed, and the flow direction of the airflow A can be referred to FIG. 11.

Figure 11:
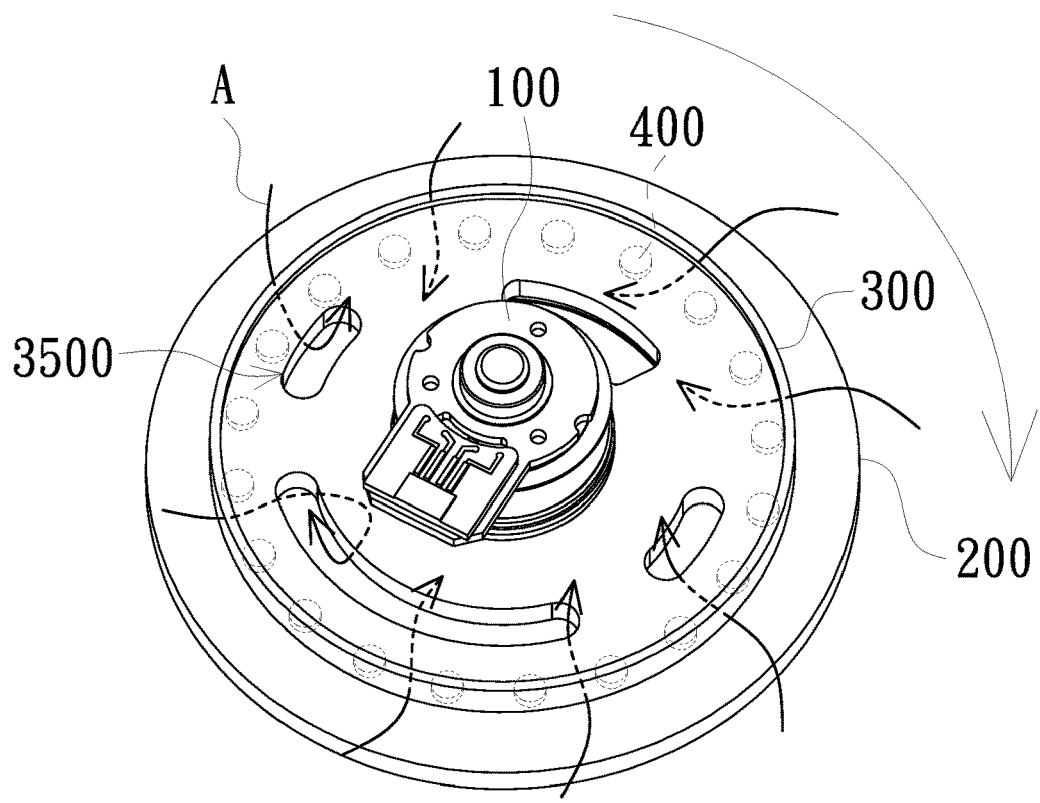
FIG. 11 is a schematic view of an airflow passage shown in FIG. 10 according to an embodiment of the invention.

As shown in FIG. 11, airflow A is generated when the driver 100 drives the support 300 and the substrate 200 to rotate. The airflow A can enter the first spacing space S1 via the gap G between the glue portions 400*a*, and then exit the first spacing space S1 via the through hole 3500 to take away heat. In an embodiment of the invention, the flow path and direction of the airflow A may be changed by other components (e.g., fan/heat dissipating component, etc.) disposed around the wavelength conversion device 10*b*. For example, the airflow A can also enter the first spacing space S1 via the through hole 3500, and then exit the first spacing space S1 via the gap G between the glue portions 400*a* to take away heat. The invention does not limit the flow path and direction of the airflow A. The airflow A helps to take away the heat generated by the wavelength conversion layer 500, and also helps to take away the heat transferred to the substrate 200, the plurality of connection units 400 and the support 300. As such, a good heat block/insulation structure for the driver 100 is provided, and a heat dissipation structure for the heat generated by the wavelength conversion layer 500 is provided, thereby maintaining the wavelength conversion layer 500 and the driver 100 at a proper temperature, extending the service life of the device, and improving the performance of the device.

Figure 12:
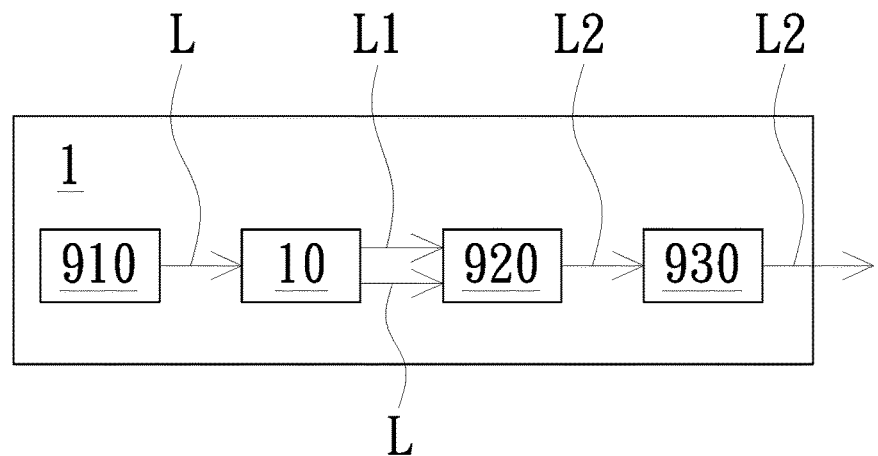
FIG. 12 is a schematic view of beam transmission in a projection device according to an embodiment of the invention.

The invention further provides a projection device 1. FIG. 12 is a schematic view of beam transmission in a projection device 1 according to an embodiment of the invention. The projection device 1 includes a wavelength conversion device 10, a light source system 910, a light valve 920 and a projection lens 930. The light source system 910 includes, for example, a laser light source or a light emitting diode light source, but the invention is not limited thereto. The light source system 910 provides an excitation beam L. The wavelength conversion device 10 is disposed on the transmission path of the excitation beam L and disposed between the light source system 910 and the light valve 920. The wavelength conversion device 10 sequentially converts the excitation beam L, provides the converted beam L1 and allows the excitation beam L to pass therethrough. The light valve 920 is located on the transmission path of the converted beam L1 and the excitation beam L, and converts the converted beam L1 and the excitation beam L into an image beam L2. The light valve 920 can be a transmissive light valve or a reflective light valve. The transmissive light valve can be a transmissive liquid crystal panel, and the reflective light valve can be a digital micro-mirror device (DMD) or a liquid crystal on silicon (LCOS) panel, but the invention is not limited thereto. The projection lens 930 is located on the transmission path of the image beam L2 and projects the image beam L2 to form a frame on, for example, a wall surface. The wavelength conversion device 10 can also be replaced by the wavelength conversion device 10*a* or 10*b* of the above embodiment. Since the wavelength conversion device 10, 10*a*, 10*b* can effectively reduce the heat conducted to the driver and has a good heat dissipation effect, thereby helping to extending the service life of the components and the overall device, and improving the optical performance of the projection device.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive.

Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first portion, the second portion, the first region and the second region are only used for distinguishing various elements and do not limit the number of the elements.

What is claimed is:

1. A wavelength conversion device, comprising a driver, a substrate and a support, wherein:
   the support is disposed between the driver and the substrate, the support is connected to the substrate and the driver, the driver drives the support and the substrate to rotate about a central axis, and the support comprises at least one through hole, wherein,
   the support further comprises a plate portion and at least one ridge, wherein:
      the plate portion is substantially parallel to the substrate and spaced from the substrate to form a first spacing space between the support and the substrate, and the first spacing space is in communication with the at least one through hole; and
      the at least one ridge is disposed on an side of the plate portion opposite to another side facing the substrate, the at least one ridge surrounds the central axis and is connected to the driver, and a second spacing space is formed by the at least one ridge, the driver and the plate portion.

2. A wavelength conversion device, comprising a driver, a substrate, a plurality of connection units and a support, wherein:
   the support is disposed between the driver and the substrate, the support is connected to the substrate and the driver, the driver drives the support and the substrate to rotate about a central axis, and the support comprises a plurality of through holes, wherein,
   the substrate has a first rotation center, the support has a second rotation center, and the central axis passes through the first rotation center and the second rotation center;
   the plurality of connection units are disposed between the substrate and the support, and are discontinuously arranged along a circumferential direction of the substrate, and contact both the substrate and the support, wherein in a radial direction, an average distance of each of the plurality of connection units from the central axis is greater than an average distance of one of the plurality of through holes of the support from the central axis, wherein,
   the plurality of connection units space the substrate apart from the support, and at least one airflow passage is formed between the substrate and the support, among the plurality of connection units, and among the plurality of through holes.

3. A projection device, comprising a light source system, a wavelength conversion device, a light valve, and a projection lens, wherein:
   the light source system provides an excitation beam;
   the wavelength conversion device converts the excitation beam and provides a converted beam, the wavelength conversion device comprises a driver, a substrate, at least one connection unit and a support, wherein:
   the support is disposed between the driver and the substrate, the support is connected to the substrate and the driver, the driver drives the support and the substrate to rotate about a central axis, and the support comprises at least one through hole; wherein the support further comprises a plate portion, the plate portion is substantially parallel to the substrate and spaced from the substrate to form a first spacing space between the support and the substrate, and the first spacing space is in communication with the at least one through hole;
   the substrate has a front surface and a rear surface opposite to each other, the support is connected to the rear surface of the substrate, the wavelength conversion device further comprises a wavelength conversion layer for converting an excitation beam, and the wavelength conversion layer is disposed on the front surface of the substrate;
   the at least one connection unit is disposed between the substrate and the support along a circumferential direction of the substrate and contacts both the substrate and the support; and in a radial direction, an average distance of the at least one connection unit from the central axis is greater than an average distance of the at least one through hole of the support from the central axis; and
   the at least one through hole used for heat insulation and/or serving as an airflow passage is disposed off-axis from the central axis;
   wherein the wavelength conversion device has a heat dissipation path passing through the wavelength conversion layer, the substrate, the at least one connection unit, and the support; and
   the light valve is located on a transmission path of the converted beam and the excitation beam and converts the converted beam and the excitation beam into an image beam; and
   the projection lens is located on a transmission path of the image beam and projects the image beam.

4. The projection device of claim 3, wherein the substrate has a first rotation center, the support has a second rotation center, and the central axis passes through the first rotation center and the second rotation center.

5. The projection device of claim 4, wherein the at least one through hole is arranged along an annular path, and a center of the annular path overlaps the second rotation center.

6. The projection device of claim 5, wherein the at least one through hole comprises a plurality of through holes arranged in a central symmetry with respect to the second rotation center.

7. The projection device of claim 3, wherein the at least one connection unit comprises a glue material for bonding the substrate and the support.

8. The projection device of claim 3, wherein the at least one connection unit is continuously arranged along the circumferential direction of the substrate.

9. The projection device of claim 8, wherein the at least one connection unit is a glue layer formed between the substrate and the support, and wherein the glue layer comprises continuously dispensed glue.

10. The projection device of claim 3, wherein the at least one connection unit is discontinuously arranged along the circumferential direction of the substrate.

11. The projection device of claim 10, further comprising a plurality of connection units, wherein the plurality of connection units comprises a plurality of glue points discontinuously dispensed between the substrate and the support.

12. The projection device of claim 3, wherein the wavelength conversion layer has a third rotation center, and the central axis passes through the third rotation center, wherein in a radial direction, an average distance of the wavelength conversion layer from the central axis is equal to or less than the average distance of the at least one connection unit from the central axis.

13. The projection device of claim 3, wherein the wavelength conversion layer has a third rotation center, and the central axis passes through the third rotation center, wherein in a radial direction, an average distance of the wavelength conversion layer from the central axis is greater than the average distance of the at least one connection unit from the central axis.

14. The projection device of claim 3, wherein the plate portion of the support comprises a first portion, a second portion and a third portion, the first portion is located outside of the at least one through hole, the third portion is located inside of the at least one through hole, the second portion is located between the first portion and the third portion, the heat dissipation path further comprises a first sub-heat dissipation path and a second sub-heat dissipation path, the first sub-heat dissipation path sequentially passes through the wavelength conversion layer, the substrate, the at least one connection unit, the first portion of the support, the second portion of the support and the third portion of the support, and the second sub-heat dissipation path sequentially passes through the wavelength conversion layer, the substrate, the at least one connection unit, the first portion of the support and air at the at least one through hole.

15. The projection device of claim 3, wherein the at least one connection unit and the support are formed integrally.

16. The projection device of claim 3, wherein an outer edge of an orthographic projection of the at least one connection unit onto the front surface is positioned from the central axis a distance greater than or equal to the distance of the outer edge of the wavelength conversion layer from the central axis.

17. A wavelength conversion device, comprising a driver, a substrate, a wavelength conversion layer, at least one connection unit and a support, wherein
the support is disposed between the driver and the substrate, the support is connected to the substrate and the driver, and the driver drives the support and the substrate to rotate about a central axis, and wherein,
the substrate has a front surface and a rear surface opposite with each other, and the support is connected to the rear surface;
the wavelength conversion layer is disposed on the front surface, a distance of an outer edge of the support from the central axis is larger than a distance of an outer edge of the wavelength conversion layer from the central axis; and
the at least one connection unit is disposed between the substrate and the support, and the at least one connection unit comprises a glue material for bonding the substrate and the support, wherein,
an outer edge of an orthographic projection of the at least one connection unit onto the front surface is positioned from the central axis a distance greater than or equal to the distance of the outer edge of the wavelength conversion layer from the central axis; and
an inner edge of the orthographic projection of the at least one connection unit onto the front surface is positioned from the central axis a distance greater than or equal to a distance of an inner edge of the wavelength conversion layer from the central axis.

* * * * *